(12) United States Patent
Husted et al.

(10) Patent No.: US 8,565,135 B2
(45) Date of Patent: Oct. 22, 2013

(54) POWER MANAGEMENT OF WIRELESS PROTOCOL CIRCUITRY BASED ON CURRENT STATE

(75) Inventors: Paul J. Husted, San Jose, CA (US); Brian J. Kaczynski, Krakow (PL); Soner Ozgur, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 12/970,739

(22) Filed: Dec. 16, 2010

(65) Prior Publication Data

US 2012/0155347 A1   Jun. 21, 2012

(51) Int. Cl.
*G08C 17/00* (2006.01)
*H04W 4/00* (2009.01)

(52) U.S. Cl.
USPC .......................................... 370/311; 370/338

(58) Field of Classification Search
None
See application file for complete search history.

(56) References Cited

U.S. PATENT DOCUMENTS

| | | | |
|---|---|---|---|
| 6,407,689 B1 | 6/2002 | Bazarjani et al. | |
| 7,389,088 B2 | 6/2008 | Kim | |
| 7,466,776 B2 | 12/2008 | Yuan et al. | |
| 7,532,869 B2 | 5/2009 | Ehrenreich et al. | |
| 7,542,529 B2 | 6/2009 | Kobayashi et al. | |
| 7,609,781 B2 | 10/2009 | Kerth et al. | |
| 7,634,290 B2 | 12/2009 | Kelton et al. | |
| 7,653,408 B1 | 1/2010 | Kopikare et al. | |
| 7,787,899 B1 | 8/2010 | Talley et al. | |
| 7,873,330 B2 | 1/2011 | Tudosoiu et al. | |
| 2007/0026839 A1 | 2/2007 | Liang et al. | |
| 2008/0044004 A1* | 2/2008 | Keehr | 379/431 |
| 2008/0069183 A1 | 3/2008 | Terada | |
| 2008/0165715 A1 | 7/2008 | Liu | |

OTHER PUBLICATIONS

U.S. Appl. No. 12/541,284, filed Aug. 14, 2009 Entitled: "Wireless Device Using a Shared Gain Stage for Simultaneous Reception of Multiple Protocols".
U.S. Appl. No. 12/323,338, filed Nov. 25, 2008 Entitled: "Wireless Device Using a Shared Gain Stage for Simultaneous Reception of Multiple Protocols".
International Search Report and Written Opinion—PCT/US2011/059156—ISA/EPO—Feb. 6, 2012.

* cited by examiner

*Primary Examiner* — Chirag Shah
*Assistant Examiner* — Srinivasa Reddivalam
(74) *Attorney, Agent, or Firm* — Bay Area Technology Law Group PC (57) ABSTRACT

Controlling power consumption in a wireless device. The wireless device may include first wireless protocol circuitry. The first wireless protocol circuitry may be configured to receive and process first signals according to a first wireless protocol. The wireless device may include a power controller coupled to the first wireless protocol circuitry. The power controller may be configured to control power consumption of elements of the first wireless protocol circuitry based on a current state. More specifically, in response to the first wireless protocol circuitry being in a listening state, the power controller may be configured to lower power consumption of one or more first elements of the first wireless protocol circuitry. Additionally, in response to the first wireless protocol circuitry being in a receiving state, the power controller may be configured to return power consumption of the one or more first elements to a higher power level.

20 Claims, 9 Drawing Sheets

POWER MANAGEMENT OF WIRELESS PROTOCOL CIRCUITRY BASED ON CURRENT STATE

BACKGROUND

1. Field of the Disclosure

The present invention relates generally to wireless communication, and more particularly to a system and method for managing power of wireless protocol circuitry based on current state information.

2. Description of the Related Art

Wireless communication is being used in a number of applications, such as in laptops, cell phones, and other wireless communication devices ("wireless devices"). Many of these wireless devices operate on battery power. Accordingly, it is important that the wireless protocol circuitry that allows for wireless communication uses the available power as efficiently as possible. Accordingly, improvements in wireless protocol circuitry power management are desired.

SUMMARY OF THE DISCLOSURE

Various embodiments are described of a system and method for managing power of wireless protocol circuitry based on current state information.

A wireless device may include a system that includes wireless protocol circuitry. The wireless protocol circuitry may be configured to receive and process signals according to a wireless protocol. For example, the wireless protocol may be WLAN and the wireless protocol circuitry may be WLAN circuitry.

The system may also include a power controller coupled to the wireless protocol circuitry. The power controller may be configured to control power consumption of elements of the wireless protocol circuitry based on a current state, e.g., of the wireless protocol circuitry.

More particularly, in response to the wireless protocol circuitry being in a listening state, the power controller may lower power consumption of one or more elements of the wireless protocol circuitry. For example, the power control may disable a filter (e.g., a switched capacitor (SC) filter) and/or an analog to digital converter (ADC) in the wireless protocol circuitry. The power controller may also (or instead) simply decrease the amount of power provided to and/or consumed by the ADC (or a different ADC) to 50% of normal power usage (although other percentages are envisioned). In general, the power consumption may be reduced by a substantial amount (e.g., at least 25%). In the listening state, the wireless protocol circuitry may search for another wireless device (e.g., an access point or beaconing device) or listen for a valid packet or preamble of a valid packet (e.g., after association with the access point).

Additionally, in response to the wireless protocol circuitry being in a receiving state (where the wireless protocol circuitry is receiving packets), the power controller may return power consumption of the elements to a higher power level. Said another way, the one or more elements may operate at a normal power level when the wireless device is receiving data. Thus, the elements may operate at a lower power consumption level in the listening state and at the normal power level when in the receiving state.

Note that in further embodiments the power controller may be configured to lower power consumption of the elements based on environmental factors, such as wireless interference.

BRIEF DESCRIPTION OF THE DRAWINGS

A better understanding of the present invention can be obtained when the following Detailed Description of the Embodiments is read in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE DISCLOSURE

Incorporation by Reference

The following applications are hereby incorporated by reference in their entirety as though fully and completely set forth herein:

U.S. application Ser. No. 12/541,284, titled "Wireless Device Using A Shared Gain Stage For Simultaneous Reception Of Multiple Protocols", filed Aug. 14, 2009, whose inventor is Paul J. Husted;

U.S. application Ser. No. 12/323,338, titled "Wireless Device Using A Shared Gain Stage For Simultaneous Reception Of Multiple Protocols", filed Nov. 25, 2008, whose inventors are Paul J. Husted, Srenik Mehta, and Soner Ozgur.

Figure 1A:
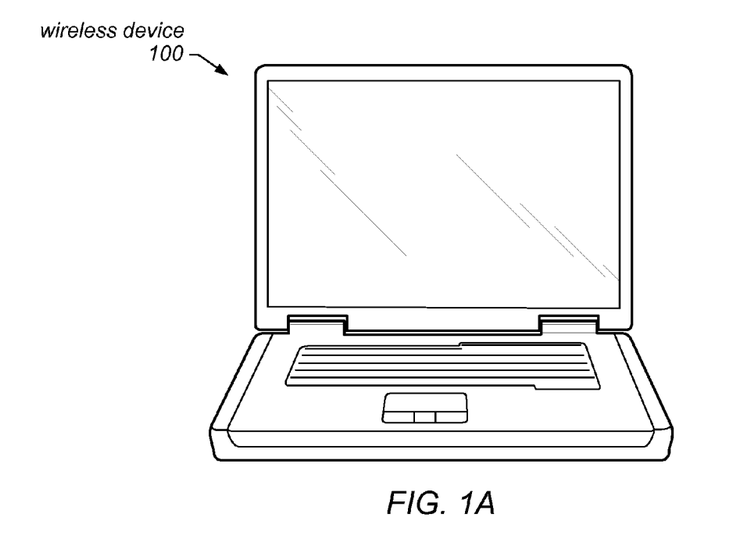
FIGS. 1A and 1B illustrates exemplary wireless devices, according to one embodiment.
Figure 1B:
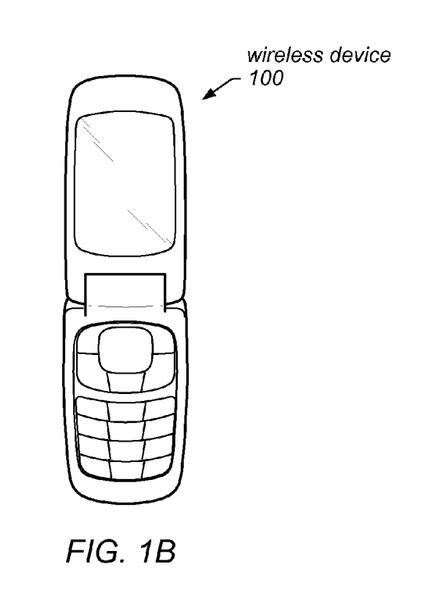

FIGS. 1A and 1B—Exemplary Wireless Device

FIGS. 1A and 1B illustrate an exemplary wireless device 100, according to one embodiment. As shown in FIG. 1A, the wireless device 100 may be a portable computer or other mobile computing device. Alternatively, as shown in FIG. 1B, the wireless device 100 may be a cell phone or smart phone or other similar mobile device (which may also be classified as a mobile computing device). However, it should be noted that other wireless devices are envisioned, such as personal digital assistants, multimedia players (portable or stationary), routers, and/or other mobile devices or computing systems which are operable to use wireless communication.

The wireless device 100 may be configured to perform wireless communication using a first wireless protocol. In some embodiments, the wireless device 100 may be configured to communicate according to other wireless protocols, such as described in the Patent Applications incorporated by reference above, as desired. The first wireless protocol may be any type of wireless protocol. In some embodiments, the first wireless protocol may be a wireless local area network (WLAN) protocol, although other protocols are envisioned, such as Bluetooth or others. As used herein, a short range wireless protocol may refer to wireless protocols which support distances of up to 1 meter to 10 meters, or in higher powered devices, 100 meters.

Figure 2:
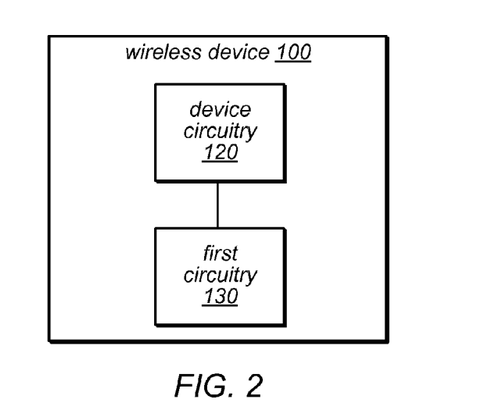
FIG. 2 illustrates an exemplary block diagram of a wireless device, according to one embodiment.

FIG. 2—Exemplary Block Diagram of the Wireless Device

As shown in FIG. 2, the wireless device 100 may include device circuitry 120 (for performing various functions of the wireless device) and first circuitry (or logic) 130.

The first circuitry 130 may include first wireless protocol circuitry and may be configured to implement various embodiments described herein. As indicated above, the first wireless protocol may be any type of wireless protocol, albeit proprietary, well-known standard or less well-known standard, such as, without limitation, 802.11 (WLAN), Bluetooth, ZigBee, Wireless USB, RFID, Dedicated Short Range Communications (DSRC), any combination thereof, or any other wireless protocol, as desired.

The device circuitry 120 may be configured to perform device functionality. For example, where the device is a music player, the device circuitry 120 may be responsible for handling and playing back music stored or received by the device. Alternatively, or additionally, where the device is a phone, the device circuitry 120 may be responsible for making and receiving phone calls. In general, the device circuitry 120 may be responsible for performing any functionality other than the wireless functionality described herein.

The various logic or circuitry described herein may be implemented in any of various ways, such as analog logic, digital logic, a processor and memory (such as a CPU, DSP, microcontroller, etc.), an ASIC (application specific integrated circuit), an FPGA (field programmable gate array), or any combination of the above. Additionally, the first circuitry 130 may be comprised on a first chip, and the device circuitry 120 may be comprised on a second chip. As used herein, the term "chip" has the full extent of its ordinary meaning, and includes an electronic device, e.g., a semiconductor device, that may be implemented in any of the ways described above. In various embodiments, the circuitry 120 and 130 may be on different chips or on the same chip, as desired. Further, the first circuitry may be comprised in the device circuitry.

The wireless device 100 may have at least one antenna for wirelessly receiving and/or transmitting signals. Thus, in some embodiments, the wireless device 100 may include an input for receiving signals, e.g., one or more antennas. The first wireless protocol circuitry may enable the wireless device 100 to transmit and/or receive wireless signals according to the first wireless protocol. For example, the first wireless protocol circuitry may enable reception, transmission, and processing of signals according to WLAN or another wireless protocol.

Additionally, the wireless device 100 (e.g., the device circuitry 120) may further include one or more memory mediums and processors for implementing various functionality. The wireless device 100 may operate as described herein.

FIGS. 3A-3E—System Supporting Power Control of a Wireless Protocol

FIGS. 3A-3D illustrate block diagrams of an exemplary system 300 supporting power control of wireless protocol circuitry for use in a wireless device. The system 300 of FIGS. 3A-3D may be implemented as a portion or chip (e.g., a separate or distinct chip) that is included in the wireless device 100.

Figure 3A:
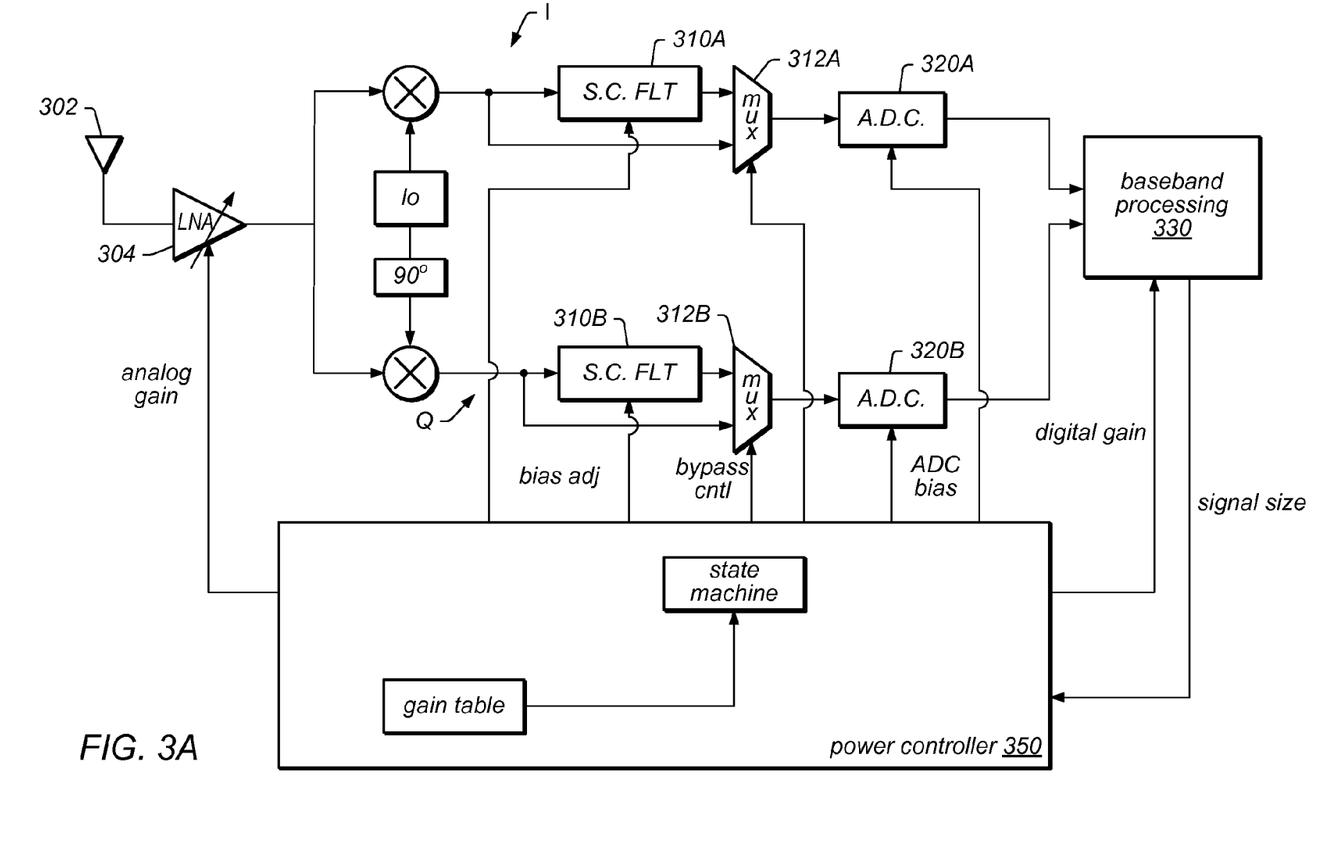
FIGS. 3A-3E are block diagrams of an exemplary system supporting power control of wireless protocol circuitry for use in a wireless device according to one embodiment.

As shown in FIG. 3A, the system 300 may include or be coupled to antenna 302 of the wireless device 100. Signals from the antenna 302 may be supplied to an amplifier 304 (shown as a low noise amplifier (LNA)). The gain of the amplifier 304 may be controlled by power controller 350, as described below.

Signals from the amplifier may be provided to an upper I pathway and a lower Q pathway, as shown, each of which is combined with a local oscillator using a mixer. In the I pathway, the combined signals may be passed through an analog filter (e.g., a switched capacitor (SC) filter or continuous time filter, etc.) 310A (or bypassed), e.g., depending on the selection by the mux 312A. The operation of the filter 310A may be controlled by the power controller 350. Additionally, the selection of the mux 312A may also be controlled by the power controller 350. Finally, along the I pathway, the output of the mux 312A may be provided to the analog to digital converter (ADC) 320A, which may in turn provide its output to baseband processing 330. The ADC bias of ADC 320A may be provided by the power controller 350. The lower Q pathway follows similar processing through filter 310B, mux 312B, ADC 320B, and baseband processing 330.

The power controller 350 may include a state machine and gain table (as shown) in order to perform power consumption adjustments of the filters and ADCs, among other possible elements. The power controller 350 may be implanted as a processor and memory, an FPGA, ASIC, or any combination thereof. Additionally, the power controller 350 may receive signal size signals from baseband processing 330 and provide digital gain signals to baseband processing 330. The power controller 350 may also use current signal size information to control the analog gain of the amplifier 304. In one embodiment, the power controller 350 may modify the analog gain of the amplifier in order to have a high enough SNR for a high rate signal and enough headroom for blockers of a low rate signal. The power controller 350 may be configured to determine the current rate and choose an appropriate analog gain, or choose an appropriate compromise if the rate is unknown. For example, in one embodiment, the power controller 350 may use the gain table to determine the analog gain of the amplifier.

Each row of the gain table may have the gain settings for each radio component with programmable gain. For example, in one embodiment, the gain table may have three columns, one for mixer gain, one for filter gain, and one for analog filter gain, although other components are envisioned. The gain table may also include information about radio imperfections (e.g., DC offset, IQ mismatch, etc.) for each row or for a group of rows. For example, there may be mapping tables that associate gain rows with imperfection tables. In one embodiment, the gain difference between two consecutive rows may be 1 dB and rows may be sorted in increasing order. Thus, the automatic gain control (AGC), which may be performed by the power controller 350, may measure the power at the A/D output at a given gain setting and calculate how many dBs (rows) the gain (index for the table) may be changed to reach a predetermined target power level of the A/D output. This way, the AGC does not need to know the absolute gain of the receive chain.

Thus, FIG. 3A illustrates an embodiment of a wireless system operating in a normal power mode, which may be capable of searching for access points or beaconing devices (which may include access points), listening for packets, actively receiving packets, etc. Generally, wireless devices (e.g., WLAN devices) spend a large part of their time listening for in-band signals. When not associated, the wireless device may need to scan multiple channels and listen for other wireless devices (e.g., access point beacons). This may require significant power consumption. Even when associated, wireless devices (e.g., WLAN clients) may be required to periodically wake and listen for packets or beacons. Additionally, these beacons or packets may not come at precise intervals (e.g., 100 ms intervals), leading to "wasted" time listening. In prior systems, power consumption is typically as high in "listen" mode as it is in active receive. For example, analog power consumption may be the same in listen mode, and perhaps even greater due to maximum amplifier gain in the absence of incoming signals. Additionally, digital power for signal detection is close to the power required for FFT and Viterbi decoder.

During normal operation, elements 310A, 310B, 320A, and 320B may all operate and consume normal power levels in order to perform their operations. For example, in the diagram of FIG. 3A, the ADCs and filters may consume 44% of analog power (which is typically greater than required digital power). Accordingly, reducing power consumption of these blocks greatly reduces power consumption of the system 300. For example, dropping ADC+filter power consumption to ~6 mA may reduce analog power consumption by 32%. In "listen" mode, the wireless protocol circuitry may not expect or need to receive high rate signals, but may generally search for low rate beacons or packet preambles (which may precede a higher rate packet body). In many conditions, e.g., when blockers or interference are not present (which may be detected by software), these low rate signals may not require higher level filtering or processing. Accordingly, as described below, the system may enter a low power mode where one or more of these elements may be disabled or instructed to operate in different manners (e.g., by power controller 350) in order to lower power consumption of the system 300.

Figure 3B:
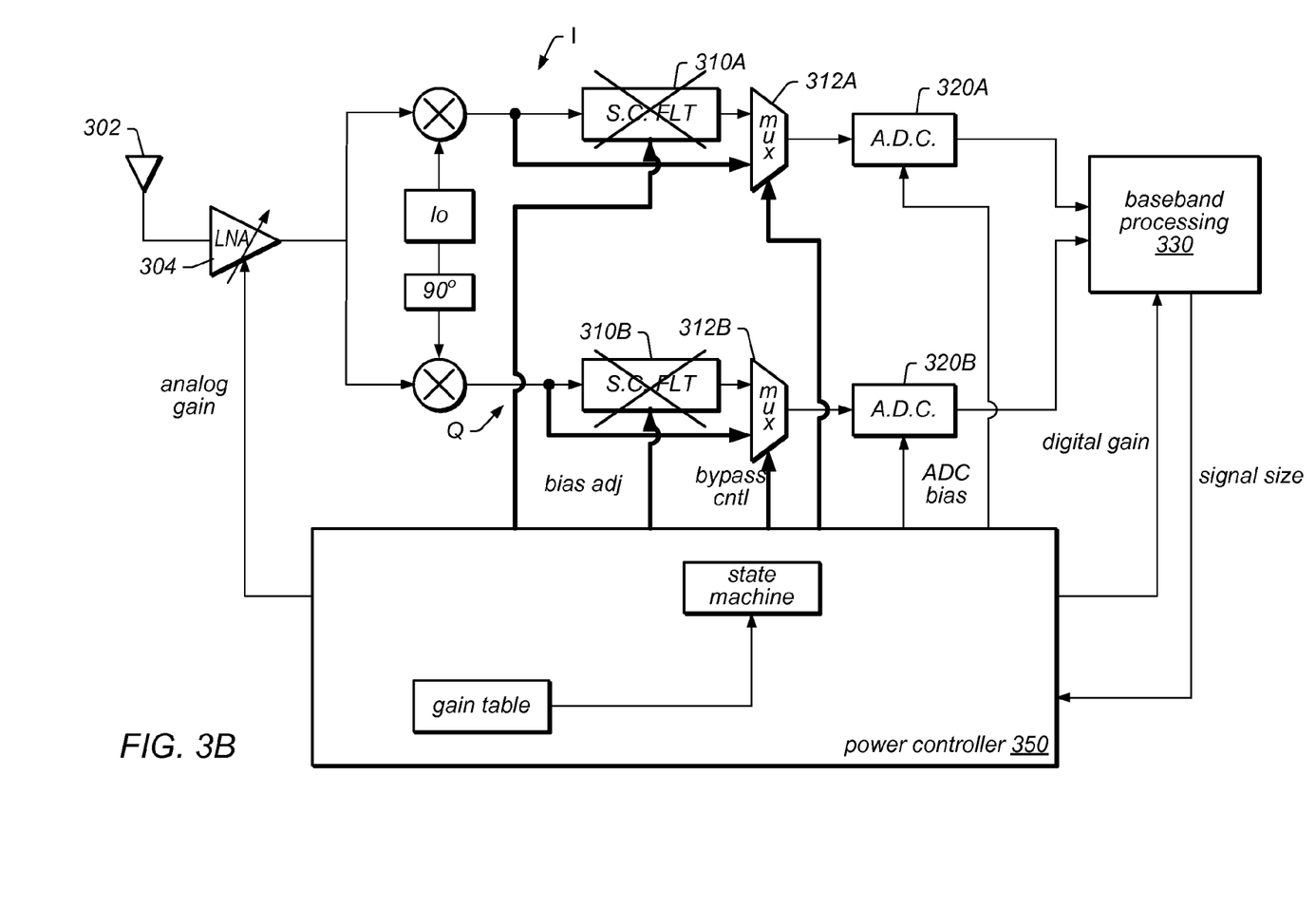

FIG. 3B illustrates one embodiment of a lower power mode, which may be used in different states of the wireless device 100 (such as described in FIG. 4 below). In this low power mode, filters 310A and 310B may be disabled (e.g., reducing filtering and ADC power consumption to approximately 6 mA) via bias adjustment signals from the power controller 350. Additionally, power controller 350 may instruct muxes 312A and 312B to select the bypassed signals (rather than those that would come from the filters). However, in alternate embodiments, instead of using a mux (or multiple muxes), the filters may be configured to carry the signal directly from the filter input to output. Note that this alternate embodiment may apply to any of the FIGS. 3A-3D. Note that in further embodiments only one of the filters may be disabled rather than both. Thus, FIG. 3B illustrates one possible low power mode for the system 300. Note that the power controller 350 may cause the system 300 to enter this mode, e.g., based on states of the wireless device 100 or wireless protocol circuitry of the wireless device. In some embodiments, the circuits may include one or more biquad filters. However, in this mode, biquad filtering may be switched to a flat response since the filters may no longer compensate for biquad peaking non-flatness. Additionally, analog filtering may be reduced from $5^{th}$ order to $2^{nd}$ order.

Figure 3C:
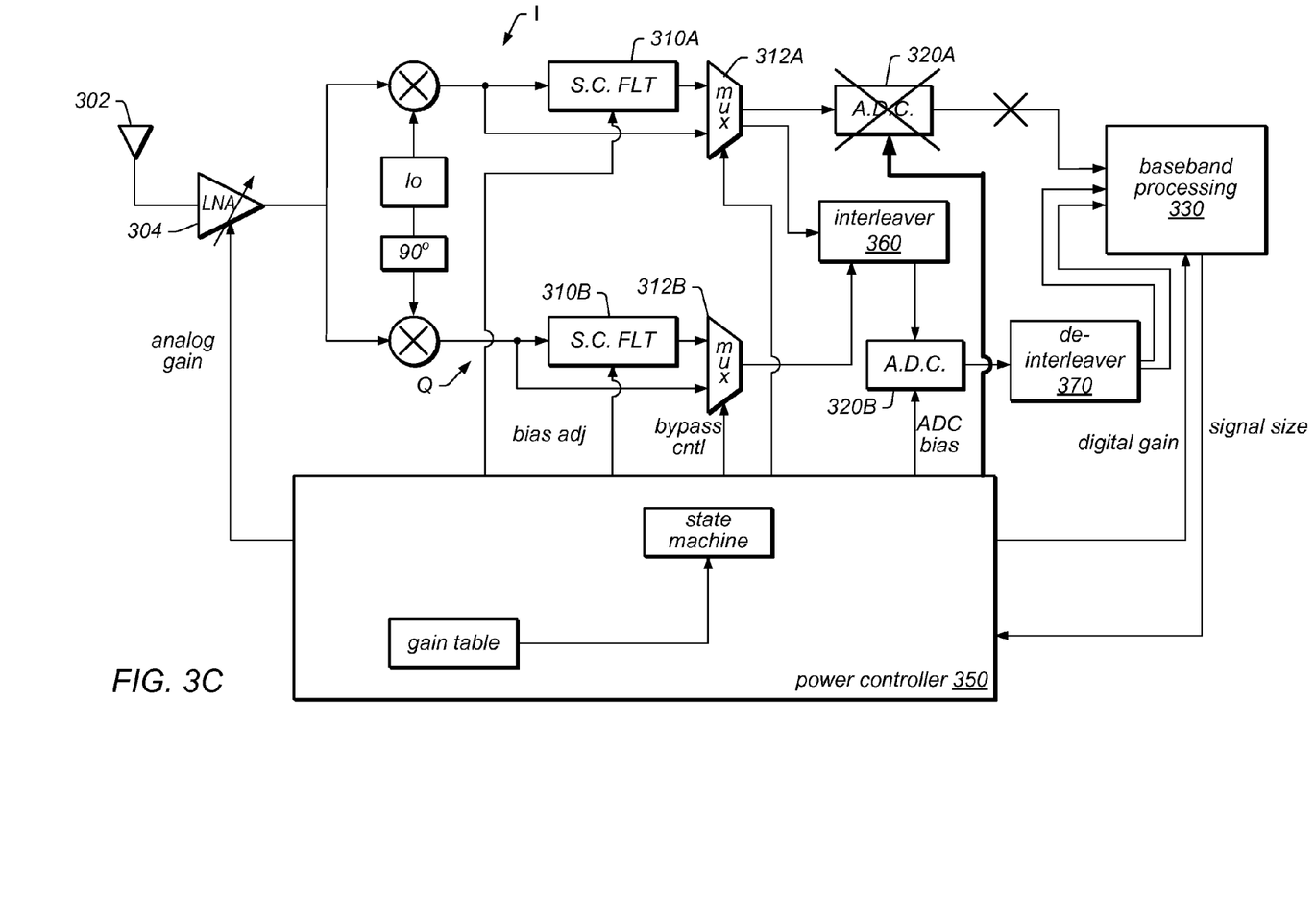

FIG. 3C illustrates another embodiment of a lower power mode, which may be used in different states of the wireless device 100 (such as described in FIG. 4 below). In this low power mode, one of the ADCs is disabled (which may save ~6 mA), in this case, ADC 320A (e.g., via ADC bias signals from the power controller 350). Accordingly, the output of the muxes 312A and 312B may be interleaved via interleaver 360. The output of the interleaver 360 may be provided to ADC 320B which may operate at a higher rate (e.g., twice its normal rate, for example from 44 MHz to 88 MHz), based on signals from the power controller 350. Accordingly, the output of the ADC 320B may be deinterleaved by deinterleaver 370, which may be provided to baseband processing 330. Similar to above, the power controller 350 may cause the system 300 to enter this mode, e.g., based on states of the wireless device 100 or wireless protocol circuitry of the wireless device.

Figure 3D:
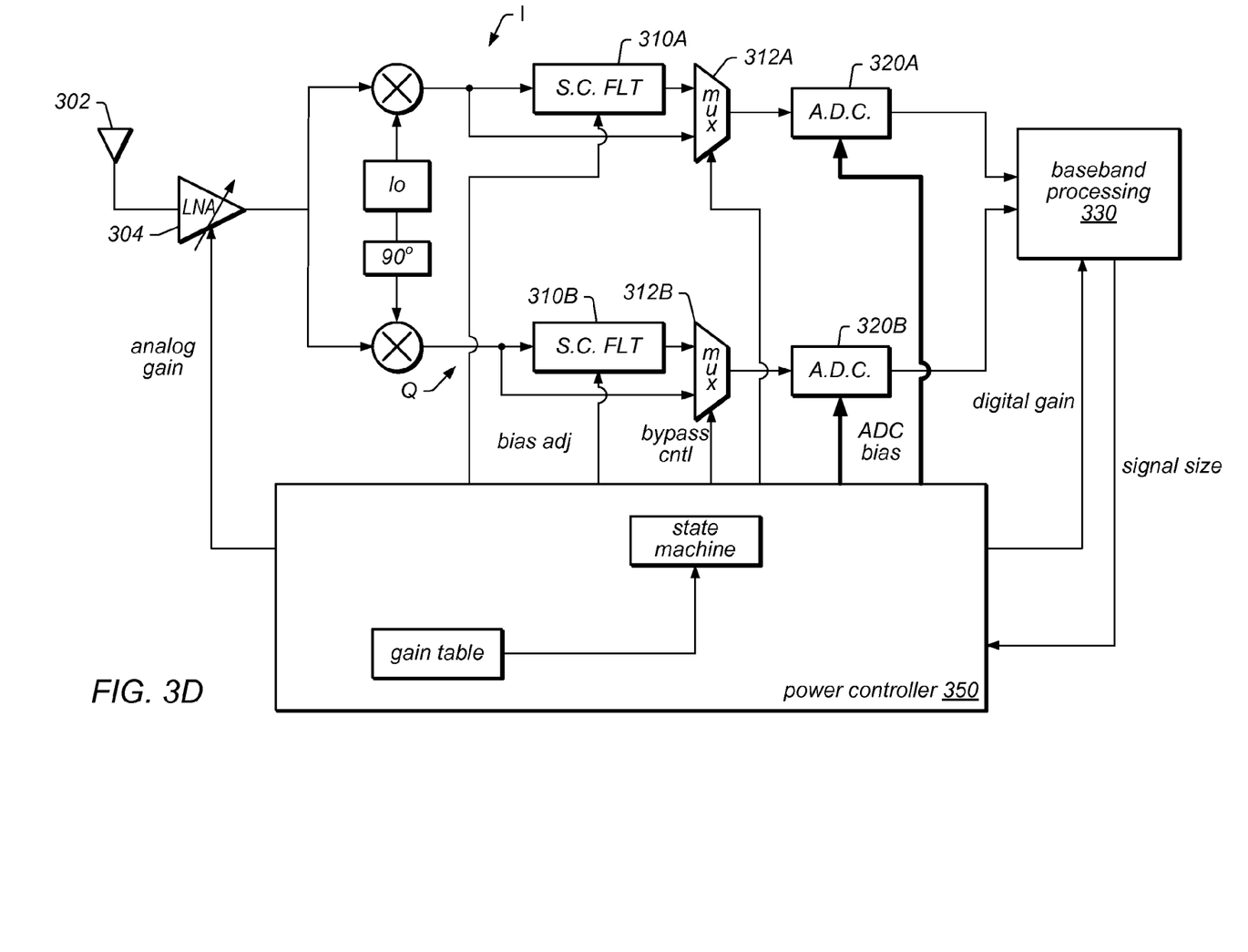

FIG. 3D illustrates another embodiment of a lower power mode, which may be used in different states of the wireless device 100 (such as described in FIG. 4 below). In this low power mode, ADCs 320A and 320B may operate at lower power levels based on signals from the power controller 350. Similar to above, the power controller 350 may cause the system 300 to enter this mode, e.g., based on states of the wireless device 100 or wireless protocol circuitry of the wireless device.

Figure 4:
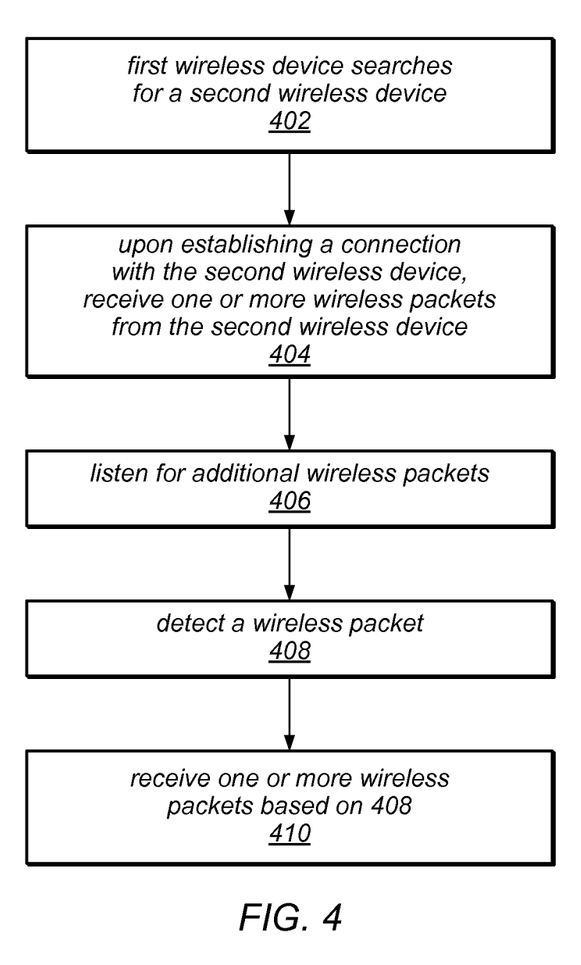
FIG. 4 is a flowchart diagram illustrating one embodiment of a method for controlling power of wireless protocol circuitry based on a current state.

Note that various ones of the above low power modes may be combined or modified to produce other low power modes that may be used, e.g., according to the method of FIG. 4. For example, the filters may be disabled similar to FIG. 3B in the low power modes of 3C and/or 3D, if desired.

Figure 3E:
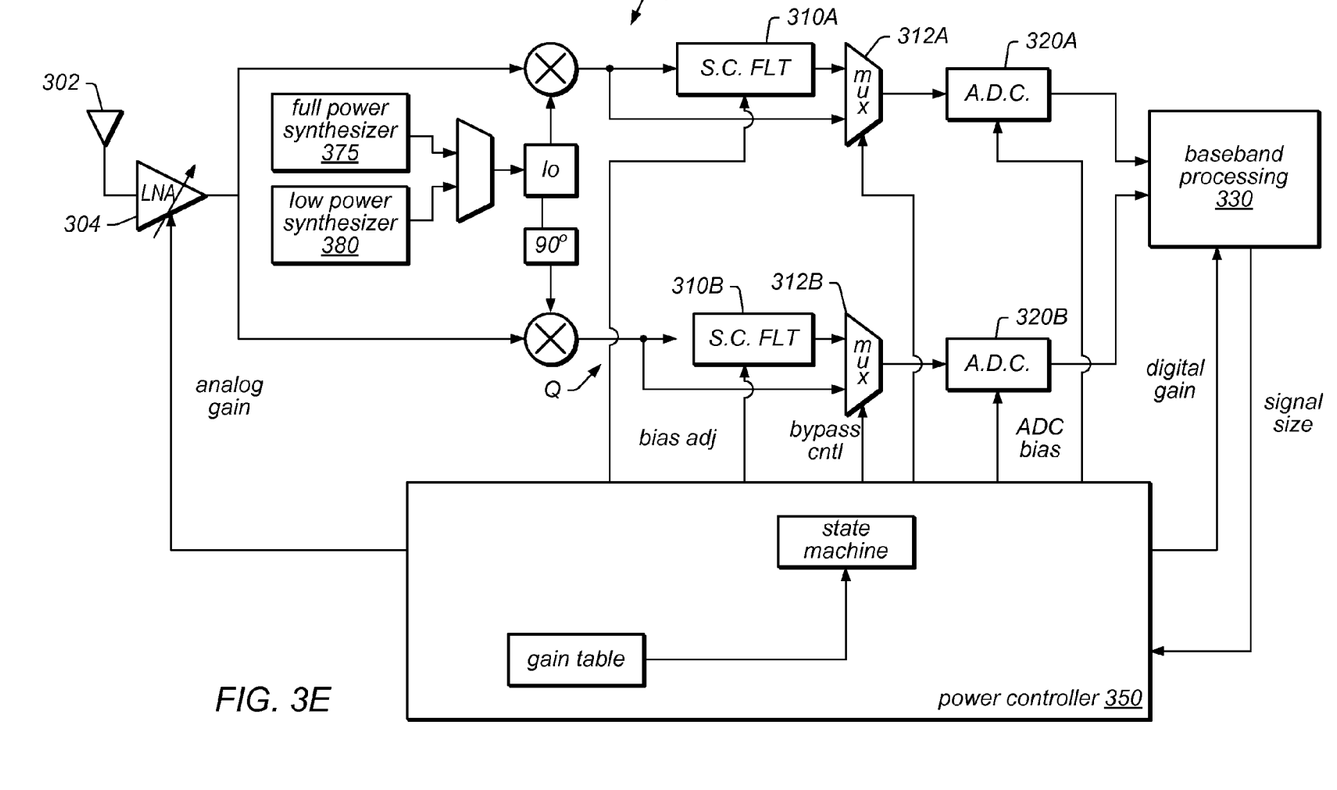

Finally, FIG. 3E illustrates another embodiment where the LO may be coupled to two different synthesizers, full power synthesizer 375 and low power synthesizer 380, which may be used in full and low power modes, respectively. In one embodiment, the mux between the synthesizers and the LO may be selectable via power controller 350. In this embodiment, the two different synthesizers may be alternated depending on the power level. Additionally, it should be noted that the LO may be replaced by a lower power consumption PLL. However, such embodiments may introduce a higher level of phase noise.

FIG. 4—Controlling Power of Wireless Protocol Circuitry Based on Current State

FIG. 4 is a flowchart diagram illustrating one embodiment of a method for controlling power of wireless protocol circuitry based on a current state. The method may be implemented in a system supporting power control of one or a plurality of wireless protocols for use in a wireless device, such as those systems described above (e.g., system 300). In some embodiments (such as might be implemented in the systems shown above and described above with respect thereto), the wireless protocol may be WLAN. The wireless protocol may alternatively be other wireless protocols. The method elements may be modified, performed in a different order, removed, etc., as desired.

In 402, a first wireless device may search for a second wireless device in order to perform wireless communication. According to various embodiments, the second wireless device may be an access point (e.g., a WLAN access point), a base station, a Bluetooth device, etc. When searching for another wireless device, the first wireless device may be in a "searching" mode or state, or more generically, a "listening" mode or state. It should be noted that a "listening" mode may generically include a "searching" mode, where the first wireless device is attempting to establish communication with the second wireless device, and may also include a "packet listening" mode or state, where the first wireless device is listening for valid packets from the second wireless device. More details on the "packet listening" mode are provided below. Also note that descriptions related to the first wireless device being in various modes or states may actually refer to the wireless protocol circuitry of the wireless device being in those modes. Thus, it may actually be the wireless protocol circuitry which is in "listening mode".

While in the listening mode, the wireless protocol circuitry may be in a "lower power mode" that is lower than a "normal power mode" (also referred to as a "higher power mode"). More particularly, rather than the entirety of the wireless protocol circuitry, specific elements of the wireless protocol circuitry may be placed in the lower power mode. The placement of specific elements of the wireless protocol circuitry in lower power mode effectively lowers the power consumption of the whole of the wireless protocol circuitry. For example, the wireless protocol circuitry may be in one of the low power modes of FIGS. 3B-3D rather than the normal power mode of FIG. 3A. As used herein, "normal power mode" or a "normal level of power consumption" refers to the level of power that is consumed by a circuit or circuit element during normal (e.g., full) operation of that circuit or circuit element. In other words, "normal power mode" is the level of power consumption that the circuit or circuit element uses when operating at its full functionality. However, a "a lower power mode" or a "lower level of power consumption" refers to a level of power that is consumed by the circuit or circuit element that is lower than (less than) the normal power level. Generally, the circuit or circuit element is not able to operate at its full functionality in the lower level of power. Additionally, the lower power level is generally reduced a substantial amount from the normal or higher power level, e.g., at least 25%, 30%, 40%, 50%, 60%, etc. As described above, the power levels of the various elements may be controlled by a power controller that is comprised in or coupled to the wireless protocol circuitry.

For example, in one embodiment (such as in FIG. 3B), in the lower power mode, the elements may include a filter (e.g., an SC filter, continuous time filter, etc.). Accordingly, lowering power consumption of the elements of the wireless protocol circuitry may include disabling the filter (e.g., by the power controller). As used herein, "disabling" an element refers to reducing the power consumption or provided power of an element to such a degree that it cannot perform its functionality.

Alternatively, or additionally, the elements may include an analog to digital converter (ADC). Lowering power consumption of the elements may include disabling the ADC (e.g., by the power controller) (such as in FIG. 3C). Note that there may be more than one ADC in the wireless protocol circuitry. Accordingly, in conjunction with disabling a first of the ADCs, the frequency of operation of the second ADC may be increased (e.g., from 44 MHz to 88 MHz) and may be used to perform the functionality of the first ADC, e.g., interleaving I and Q chain signals to the second ADC.

In further embodiments (such as in FIG. 3D), the power controller may simply decrease the amount of power provided to and/or consumed by the ADC(s) to 50% of normal power usage (although other percentages are envisioned). In general, the power consumption may be reduced by a substantial amount (e.g., at least 25%). In the lowered power level (but not being disabled), the ADC may still perform ADC functionality, but it may not be as effective (e.g., may require a higher signal to noise ratio (SNR) than when at the higher or normal power level).

In 404, upon establishing a connection (or while establishing the connection), the first wireless device may receive one or more wireless packets from the second wireless device according to a wireless protocol. In some embodiments, the receiving may be performed by wireless protocol circuitry of the wireless device, e.g., WLAN circuitry of a wireless device. While receiving the wireless packets, elements of the wireless protocol circuitry may operate at the normal power level. Thus, some or all of the elements of the wireless protocol circuitry may be returned to a normal or higher power level during reception of wireless packets. When receiving, the wireless protocol circuitry may be in a receiving mode or state.

In 406, after receiving the wireless packets in 404, the wireless device may listen for additional wireless packet(s). In other words, the wireless protocol circuitry may be in a "listening mode" and more particularly in a "packet listening" mode. Similar to above, when in the "listening mode", power consumption of elements of the first wireless protocol circuitry may be lowered in response to the first wireless protocol circuitry entering the listening state, wherein, when lowered, the power consumption of the one or more elements is lower than the normal power level.

In 408, while in the listening mode, the wireless device may detect a wireless packet (e.g., a preamble of the wireless packet). Upon detection of a valid wireless packet, the wireless protocol circuitry may enter the receiving mode or state, and accordingly, power consumption of at least one of the particular elements may be returned to the normal power level in response to the first wireless protocol circuitry entering the receiving state.

Finally, in 410, based on the detection in 408, the wireless device may receive one or more wireless packets, similar to the description in 404. Note that the wireless protocol circuitry may be configured to both detect the wireless packet in 408 (e.g., a preamble of the wireless packet) and receive that packet (e.g., the body of the packet) in 410. Thus, the change in mode may be fast enough to receive the detected wireless packet. However, where this is not possible, any subsequent packets may be received in the receiving mode.

In further embodiments, the lowering and returning of power levels may also be based on other factors, rather than just the particular mode of the wireless device or wireless protocol circuitry. For example, the power levels may be based on environmental factors (e.g., the amount of interference or blocking signals on the wireless channel) and/or the strength of the received signals. More particularly, where there is lower signal size or less SNR for low modulation rates and larger blockers or there is higher signal size or more SNR for high modulation rates and smaller blockers, some of the elements (e.g., the ADC(s)) may be able to continue to operate in the lower power level during reception of wireless packets.

Exemplary Modes of Operation and Gain Changes

The following describes one particular embodiment for operation of the wireless protocol circuitry. Note that this embodiment does not limit the above description or claims, but is provided for illustration purposes only.

In this particular embodiment, two different radio configurations may be used: "full dynamic range configuration" may be the normal, default operation (e.g., as shown in FIG. 3A); and "reduced power configuration", which may be a combination of one or more low power modes of FIGS. 3B and 3D.

Additionally, three different modem configurations may be used. Each mode may use a same gain table, as shown in FIGS. 3A-3E. The modes are as follows:

1. full power listen—the default mode. In this mode, the radio configuration is static and in the "full dynamic range configuration".

2. static low power listen. In this mode, the radio configuration is static and in the "reduced power configuration". In reduced power mode, the state machine may: at every gain change event: calculate a new gain index; calculate a gain index correction (which may be a function of past and new gain settings of the filters); and apply a corrected gain index.

3. dynamic low power listen. In this configuration, the radio configuration may be dynamically controlled. The radio may be initialized to the "reduced power configuration". At every gain change event: a new gain index may be calculated, a gain index correction may be calculated (as above, may be a function of past and new gain settings of the filters); and a corrected gain index may be applied. When a beginning of a packet is detected AND is necessary gain change is indicated: a new gain index may be calculated; a gain index correction may be calculated; a corrected gain index may be applied; and the radio may be switched to "full dynamic range configuration". After the packet is received the radio may be switched back to "reduced power configuration" and the gain correction may be reverted.

Figure 5:
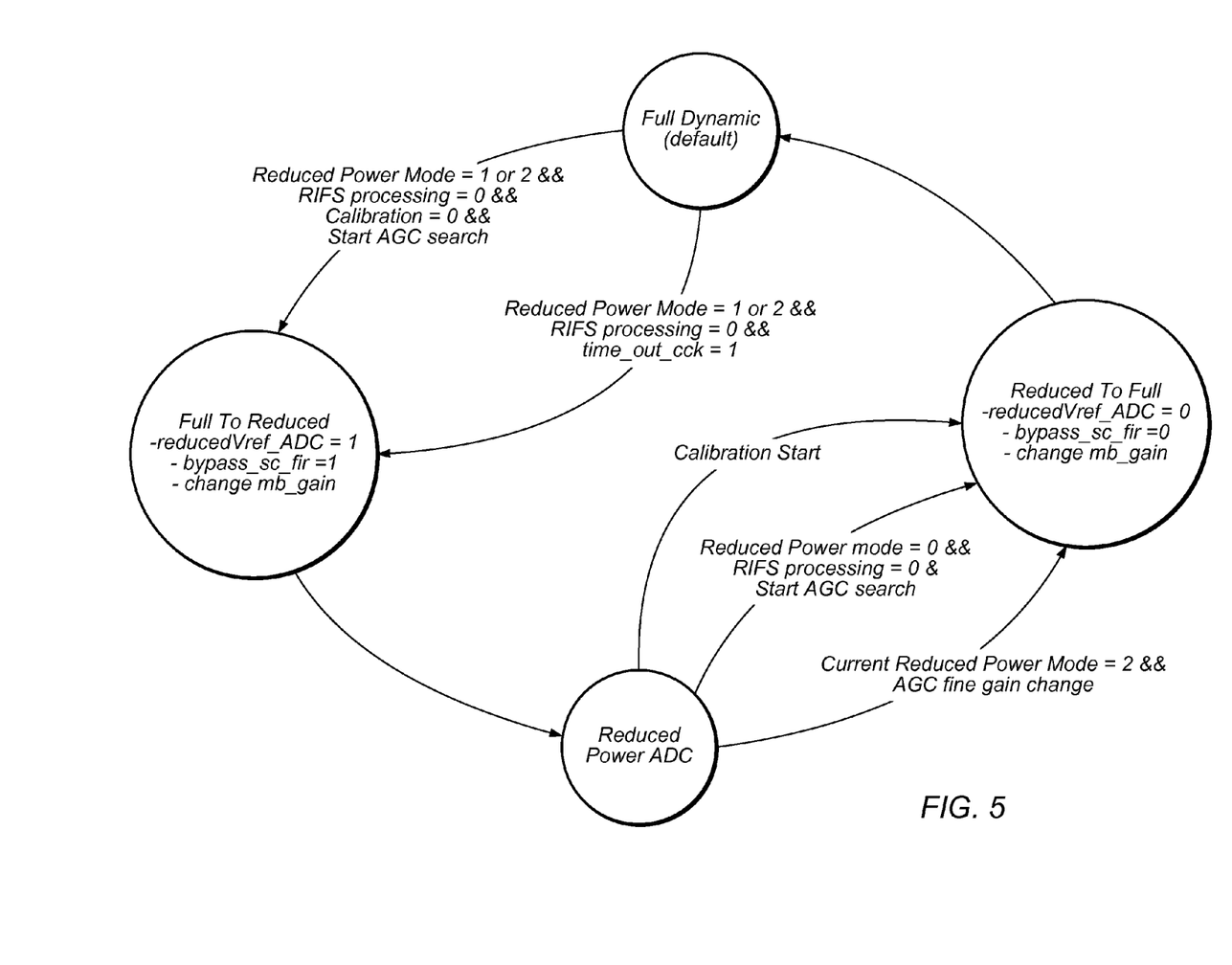
FIG. 5 is a state diagram illustrating different power states and conditions, according to one embodiment.

FIG. 5 illustrates an exemplary state machine for radio configuration transitions during operation. The state machine control includes radio configuration control (e.g., including reduced ADC as in FIG. 3C or 3D and filter bypass as in FIG. 3B), gain adjustment, and mode changes to full dynamic range mode when in calibration mode. In this embodiment, the reduced power mode may be used during normal receive. All the calibrations except noise floor calibration may be performed in full dynamic range mode. As shown, the default mode may be "full dynamic" state, which may transition to "reduced power ADC" state via "Full to Reduced" state. "reduced power ADC" state may return to "full dynamic" state via "reduced to full" state. In "full to reduced" state, the ADC power may be reduced, the analog filters (e.g., SC filters) may be bypassed, and the gain may be changed. The state may be entered if either low power mode is entered.

If the WLAN device is not associated with another wireless device (e.g., an access point), or if traffic is sporadic, it may enter listening mode if nearby interference is not overwhelming and/or power consumption reduction is desired. In some embodiments, interference can be measured by scanning background present in nearby channels, polling other devices for interference information, detecting unexplained packet failures with sufficient RSSI that should have been received properly, etc.

In one embodiment, software (e.g., of the power controller) may be executable to switch the ADC to low power mode. The software may also be executable to decrease automatic gain control (AGC) target sizes to allow more headroom for blocker. In this mode, highest MCS rates will be detected, but may have bit errors. However, access point beacons are typically sent at low rates, so association is not a problem. Thus, the software may use information about the expected received modulation rate to determine which power saving state to be in. High modulation rates may require either dynamic power saving or no power saving at all, while low modulation rates (e.g., including beacons) may allow for static power saving throughout the receive mode. Additionally, the software may be executable to detect the existence of valid packets and exit low power listen mode, to better receive the next packet. More specifically, in one embodiment, if the system is in static low power mode and detects a preamble for a valid high modulation rate packet, it may choose to change to dynamic power saving mode, or even turn off power saving mode.

In another embodiment, the power controller may place the system in low power listen mode during AGC search time and upon a gain change, the AGC may enable full ADC operation. In this embodiment, settling time of enabling ADC should fit within a typical gain change settling time.

The low power modes may also be used for packet reception. However, less analog filtering may require lower signal size or less SNR for low modulation rates and larger blockers; or higher signal size or more SNR for high modulation rates and smaller blockers. If the power controller or software can determine that the device is operating in one of these conditions, it may enable the elements (e.g., the ADCs) to stay in low power mode during packet reception. In some embodiments, recent PHY rates may be read to determine if less SNR is acceptable, background spectral scans can be used to determine if no large blockers are present; and the power controller or software can monitor these two metrics to see if full filtering should be enabled. This mode may work for either HT20 or HT40 using the ADC schemes described herein.

Figure 6:
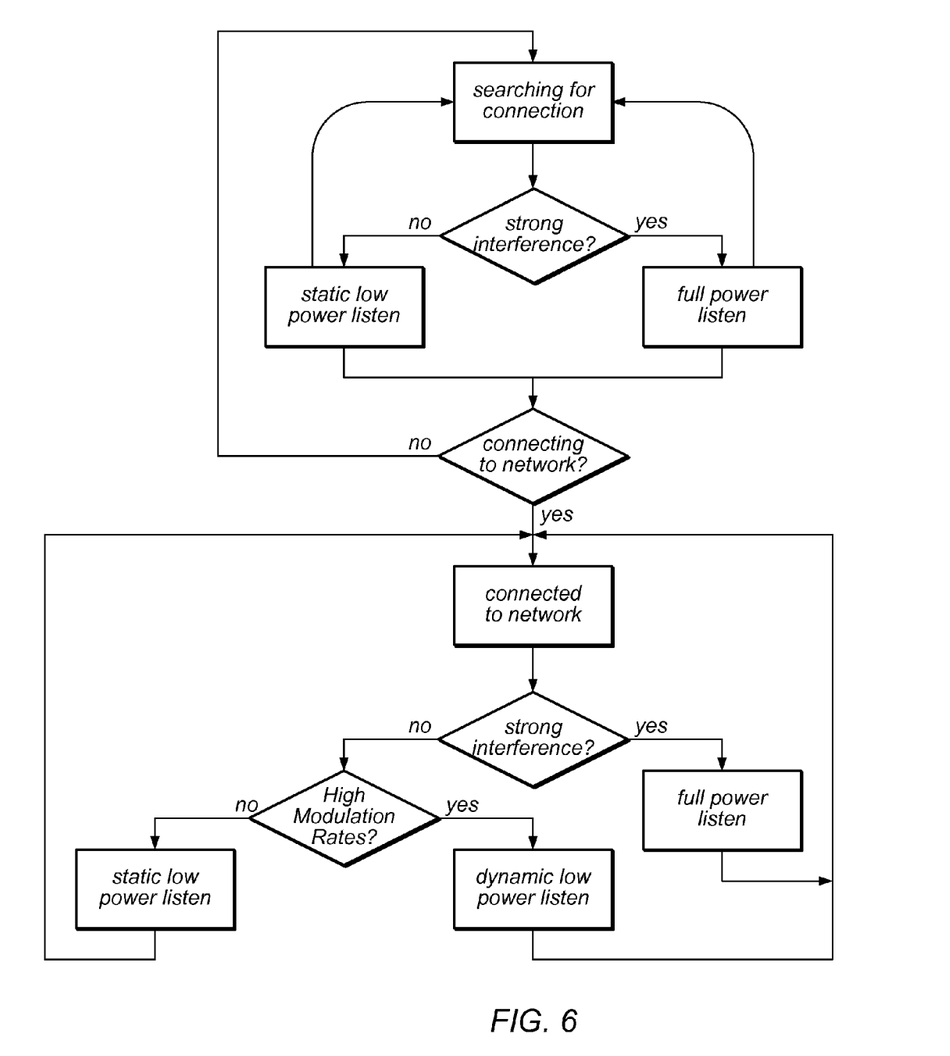
FIG. 6 is a flowchart diagram illustrating a specific embodiment of the method of FIG. 4.

FIG. 6 is a flowchart diagram illustrating one embodiment of operation between the different power modes. As shown, if the device is searching for a connection and there is strong interference, full power listen mode may be used. If not, static low power listen mode may be used. When connected to a network, if there is strong interference, full power listen mode may be used. If there is not, if there are high modulation rates, dynamic low power listen mode may be used. If there are not high modulation rates, static low power listen mode may be used.

As indicated above, the AGC may also adjust analog gains when the mode changes. The switched capacitor FIR gain needs to be programmed in monotonic way. The following lists all the gain changes when in state transitions as well as when in reduced power mode:

Gain Change (full dynamic to reduced power):
select gain_corr_db2 based on ADC frequency
if current sc_fir=0, decrease mb_gain by (12+selected gain_corr_db2)-~7.1 db
if current sc_fir=1, decrease mb_gain by selected gain_corr_db2-~1.1 db
If sc_fir=0 after gain decrase, decrease mb_gain by 12 ~7.1 db total
Gain Change (when in reduced power mode), at the end of normal gain correction calculation:
if ADC saturation or power high
  decrease rf_gain more by kquickdrop_rf
else
if old sc_fir=0 && sc_fir=1, increase gain by scfir_adj_gain ~6 db
if old sc_fir=1 && new sc_fir=0, decrease gain by scfir_adj_gain ~6 db
Gain Change (reduced power to full dynamic), fine gain change case, at the end of normal gain correction calculation
select gain_corr_db2 based on ADC frequency
if new sc_fir=0, increase mb_gain by (12+selected gain_corr_db2) ~7.1 db
if new sc_fir=1, increase mb_gain by selected gain_corr_db2 ~1.1 db
Gain Change (reduced power to full dynamic), calibration and reduced power mode switch off cases
select gain_corr_db2 based on ADC frequency
if current sc_fir=0, increase mb_gain by (12+selected gain_corr_db2) ~7.1 db
if current sc_fir=1, increase mb_gain by selected gain_corr_db2 ~1.1 db
In the above, the following describes the variables used:
gain_corr_db2—RC filter gain correction value. This value depends on ADC sampling frequency and need to be updated if ADC sampling frequency changes. Signed 2's complement format. −16 to 15 in half dB.
scfir_adj_gain—Gain adjustment value when switched capacitor setting changes in reduced power mode.
kquickdrop_rf-Additional rf_gain reduction value when ADC is saturated. Unsigned binary format in half dB Also note that the gain changes referenced above may apply to the LNA gain in FIG. 3A. In further embodiments, they may also apply to filter gain changes or baseband gain changes.

HT40

Some embodiments related to use of a single ADC with interleaving may not be feasible for use for HT40. More specifically, 40 or 44 MHz effective sampling may not be enough for HT40 operation. Additionally, there may be a problem for HT20 control channel in HT20-40 mode. For example, due to 10 MHz low-IF offset, Nyquist BW may not be high enough with a 40 MHz ADC.

Accordingly, filters may be turned off or disabled, but both ADCs may remain enabled for HT40. Such an embodiment may still save 12 mA, which may be approximately 50% of ADC+filter power. This embodiment may still allow for full operation. Further, similar AGC size reductions may be needed for HT20 mode, but the hardware changes should be similar to needs of HT40.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for use in a wireless device, the system comprising:
   first wireless protocol circuitry, wherein the first wireless protocol circuitry is configured to receive and process first signals according to a first wireless protocol;
   a power controller coupled to the first wireless protocol circuitry, wherein the power controller is configured to control power consumption of elements of the first wireless protocol circuitry based on a current state, wherein the power controller is configured to:
      in response to the first wireless protocol circuitry being in a listening state, lower power consumption of one or more first elements of the first wireless protocol circuitry;
      in response to the first wireless protocol circuitry being in a receiving state, return power consumption of the one or more first elements to a higher power level, wherein the one or more first elements comprise a first analog to digital converter (ADC), wherein lowering power consumption of the one or more first elements of the first wireless protocol circuitry comprises disabling the first ADC, and wherein, in response to the first wireless protocol circuitry being in the listening state, the power controller is configured to increase a clock rate of a second ADC, wherein, at the higher clock rate, the second ADC is configured to perform analog to digital conversion for the first ADC.

2. The system of claim 1,
   wherein the one or more first elements operate at a normal power level when the wireless device is receiving data;
   wherein in response to the first wireless protocol circuitry being in the listening state, the power controller is configured to lower power consumption of one or more first elements of the first wireless protocol circuitry from the normal power level to a lower power level;
   wherein in response to the first wireless protocol circuitry being in the receiving state, the power controller is configured to return power consumption of the one or more first elements to the normal power level.

3. The system of claim 1, wherein the one or more first elements comprise a analog filter, wherein lowering power consumption of the one or more first elements of the first wireless protocol circuitry comprises disabling the analog filter.

4. The system of claim 1, wherein the one or more first elements comprise an analog to digital converter (ADC), wherein lowering power consumption of the one or more first elements of the first wireless protocol circuitry comprises lowering power to the ADC by at least half.

5. The system of claim 1, wherein, in the listening state, the first wireless protocol circuitry is configured to search for a beaconing device.

6. The system of claim 1, wherein, in the listening state, the first wireless protocol circuitry is configured to listen for a valid packet.

7. The system of claim 6 wherein, upon detection of the valid packet, the first wireless protocol circuitry is configured to enter the receiving state, wherein the power controller is configured to return power consumption of the one or more first elements to the higher power level in order to receive the valid packet and/or any subsequent packets.

8. The system of claim 1, wherein the first wireless protocol is WLAN, wherein the first wireless protocol circuitry comprises WLAN circuitry.

9. A method for controlling power consumption in a wireless device, comprising:
   receiving one or more wireless packets according to a first wireless protocol, wherein said receiving is performed by first wireless protocol circuitry of the wireless device, wherein during said receiving the one or more wireless packets, elements of the wireless protocol circuitry operate at a normal power level;
   lowering power consumption of one or more first elements of the first wireless protocol circuitry in response to the first wireless protocol circuitry entering a listening state, wherein, when lowered, the power consumption of the one or more elements is lower than the normal power level,
   wherein the one or more first elements comprise a first analog to digital converter (ADC), wherein said lowering power consumption of the one or more first elements of the first wireless protocol circuitry comprises disabling the first ADC and wherein said lowering power consumption further comprises increasing a clock rate of a second ADC, wherein at the higher clock rate, the second ADC is configured to perform analog to digital conversion for the first ADC.

10. The method of claim 9, further comprising:
    returning power consumption of the one or more first elements to the normal power level in response to the first wireless protocol circuitry entering a receiving state.

11. The method of claim 9, wherein the one or more first elements comprise a analog filter, wherein said lowering power consumption of the one or more first elements of the first wireless protocol circuitry comprises disabling the analog filter.

12. The method of claim 9, wherein the one or more first elements comprise an analog to digital converter (ADC), wherein said lowering power consumption of the one or more first elements of the first wireless protocol circuitry comprises lowering power to the ADC by at least half.

13. The method of claim 9, wherein, in the listening state, the first wireless protocol circuitry is configured to search for a beaconing device.

14. The method of claim 9, wherein, in the listening state, the first wireless protocol circuitry is configured to listen for a valid packet, wherein, upon detection of the valid packet, the first wireless protocol circuitry is configured to enter a receiving state, wherein the method further comprises:
    returning power consumption of the one or more first elements to the normal power level in response to the first wireless protocol circuitry entering the receiving state in order to receive the valid packet and/or any subsequent packets.

15. The method of claim 9, wherein the first wireless protocol is WLAN, wherein the first wireless protocol circuitry comprises WLAN circuitry.

16. A non-transitory memory medium storing program instructions, wherein the program instructions are executable by a processor to:

in response to first wireless protocol circuitry being in a listening state, lower power consumption of one or more first elements of the first wireless protocol circuitry, wherein the first wireless protocol circuitry is configured to receive and process first signals according to a first wireless protocol;

in response to the first wireless protocol circuitry being in a receiving state, return power consumption of the one or more first elements to a higher power level, wherein the one or more first elements comprise a first analog to digital converter (ADC), wherein said lowering power consumption of the one or more first elements of the first wireless protocol circuitry comprises disabling the first ADC and wherein said instructions to lower power consumption further comprise instructions to increase a clock rate of a second ADC, wherein, at the higher clock rate, the second ADC is configured to perform analog to digital conversion for the first ADC.

17. The non-transitory memory medium of claim 16, wherein the program instructions are further executable to place the first wireless protocol circuitry in the listening state and place the wireless circuitry in the receiving state.

18. The non-transitory memory medium of claim 17, wherein placing the first wireless protocol in the listening state or the receiving state is performed in response to an expected modulation level.

19. The non-transitory memory medium of claim 18, wherein placing the first wireless protocol in the listening state or the receiving state is performed in response to blockers present in the wireless medium.

20. The non-transitory memory medium of claim 17, wherein placing the first wireless protocol in the listening state or the receiving state is performed in response to one or more received signal strength indicators (RSSIs).

* * * * *